(12) United States Patent
Nicolas et al.

(10) Patent No.: US 6,554,990 B1
(45) Date of Patent: Apr. 29, 2003

(54) PROCESS FOR THE MANUFACTURE OF ALKALI METAL HYDROXIDE

(75) Inventors: Edgard Nicolas, Brussels (BE); Luc Botte, Castiglioncello (IT); Francesco Posar, Rosignano-Solvay (IT); Stefano Bigini, Amelia (IT)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 08/360,335

(22) Filed: Dec. 21, 1994

(30) Foreign Application Priority Data

Dec. 24, 1993 (IT) .......................................... MI93A2736

(51) Int. Cl.⁷ .............................................. B01D 61/44
(52) U.S. Cl. ........................ 204/523; 204/534; 204/631; 204/634
(58) Field of Search ................................. 204/98, 182.4, 204/182.5, 301, 523, 534, 631, 634

(56) References Cited

U.S. PATENT DOCUMENTS

| | | | |
|---|---|---|---|
| 2,829,095 A | * 1/1958 | Oda et al. ...................... | 204/98 |
| 4,284,492 A | 8/1981 | Karn ........................... | 204/299 |
| 4,592,817 A | 6/1986 | Chlanda et al. ........... | 204/182.4 |
| 4,976,838 A | * 12/1990 | Mani et al. .............. | 204/182.3 |

FOREIGN PATENT DOCUMENTS

| | | |
|---|---|---|
| FR | 2 675 709 | 10/1992 |
| GB | 845544 | 5/1956 |
| WO | WO 89/01059 | 2/1989 |

* cited by examiner

Primary Examiner—Arun S. Phasge
(74) Attorney, Agent, or Firm—Venable LLP.; Marina V. Schneller

(57) ABSTRACT

Process for the manufacture of alkali metal hydroxide, according to which an electrodialysis cell containing three compartments is used, an aqueous alkali metal halide solution is circulated in a saline compartment of the cell, delimited between an anionic membrane and a cationic membrane, an alkali metal halide is introduced into an acidic compartment of the cell, delimited between the anionic membrane and a cationic face of a bipolar membrane and an aqueous alkali metal hydroxide solution is extracted from an alkaline compartment of the cell, delimited between the cationic membrane and an anionic face of the bipolar membrane.

8 Claims, 2 Drawing Sheets

US 6,554,990 B1

PROCESS FOR THE MANUFACTURE OF ALKALI METAL HYDROXIDE

FIELD OF THE INVENTION

The invention relates to a process for the manufacture of alkali metal hydroxide.

TECHNOLOGY REVIEW

It relates more particularly to a process for the manufacture of alkali metal hydroxide, especially of sodium hydroxide, by electrodialysis of an aqueous solution of alkali metal halide in an electrodialysis cell.

SUMMARY OF THE INVENTION

U.S. Pat. No. 4,592,817 describes a process for the manufacture of aqueous alkali metal hydroxide solutions by electrodialysis of aqueous alkali metal chloride solutions in an electrodialysis cell of the type containing three compartments which are defined respectively between an anionic membrane, a cationic membrane and a bipolar membrane which is inserted between the anionic membrane and the cationic membrane. To this end, an aqueous alkali metal chloride solution is introduced into the saline compartment of the cell, delimited between the anionic membrane and the cationic membrane, and, on the one hand, an aqueous alkali metal hydroxide solution is collected from the alkaline compartment, delimited between the cationic membrane and an anionic face of the bipolar membrane, and, on the other hand, an aqueous hydrochloric acid solution is collected from the acidic compartment, delimited between the anionic membrane and a cationic face of the bipolar membrane.

In this known process, the aqueous alkali metal hydroxide solution which is collected from the electrodialysis cell is diluted by the water of hydration of the alkali metal cations which cross the cationic membrane. The concentration of the aqueous alkali metal hydroxide solution will consequently depend on the concentration of the alkali metal chloride solution used. Substantially saturated alkali metal chloride solutions are usually used. However, it is observed in practice that the aqueous alkali metal hydroxide solutions obtained in this known process have a water content which is substantially higher than that predicted on the basis of the concentration of the alkali metal chloride solution and on the basis of the operating conditions of the electrodialysis cell, which may constitute a drawback.

The invention tends to overcome this drawback of the known process described above, by providing an improved process which enables more concentrated aqueous alkali metal hydroxide solutions to be obtained.

Consequently, the invention relates to a process for the manufacture of alkali metal hydroxide, according to which an electrodialysis cell containing three compartments is used, an aqueous alkali metal halide solution is circulated in a saline compartment of the cell, delimited between an anionic membrane and a cationic membrane, and an aqueous alkali metal hydroxide solution is extracted from an alkaline compartment of the cell, delimited between the cationic membrane and an anionic face of a bipolar membrane; according to the invention, an alkali metal halide is introduced into an acidic compartment of the cell, which is delimited between the anionic membrane and a cationic face of the bipolar membrane.

DETAILED DESCRIPTION OF THE INVENTION

Figure 1:
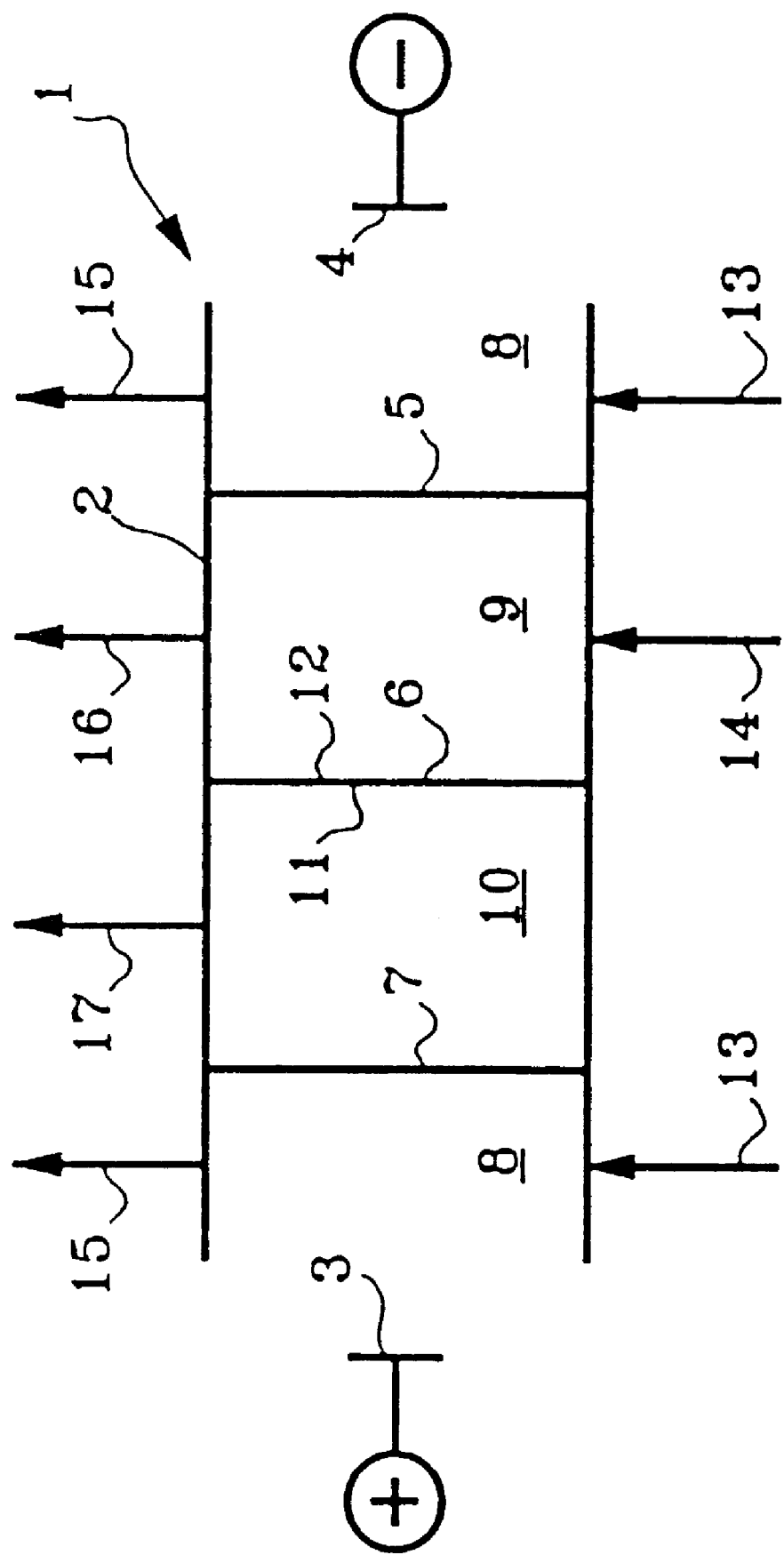
FIG. 1 is a schematic illustration of an electrodialysis cell successively comprising, between the cathode 4 and the anode 3, an anionic membrane 5, a bipolar membrane 6, and a cationic membrane 7, respectively defining a saline compartment 8, an acidic compartment 9, and an alkaline compartment 10. The bipolar membrane has its anionic face 11, facing towards the anode 3, and its cationic face 12 facing towards the cathode 4.

In the process according to the invention, the term cationic membrane is understood to denote a thin, nonporous sheet which is selectively permeable to cations and impermeable to anions. The cationic membranes which may be used in the process according to the invention must be made of a material which is inert towards aqueous sodium hydroxide solutions. Cationic membranes which may be used in the process according to the invention are, for example, sheets of fluoropolymer containing cationic functional groups derived from sulphonic acids, from carboxylic acids or from phosphonic acids, or mixtures of such functional groups. Membranes which are particularly suited to this application of the cell according to the invention are those known under the names NAFION® (DU PONT) and FLEMION® (ASAHI GLASS COMPANY Ltd.).

An anionic membrane is a thin, nonporous sheet which is selectively permeable to anions and impermeable to cations. Anionic membranes which may be used in the process according to the invention are sheets made of a polymer material which is inert towards aqueous acidic or basic solutions and which comprises quaternary ammonium or pyridinium groups, these acting as stationary anionic sites.

The bipolar membranes are membranes which have, on one face, the properties of a cationic membrane and, on the other face, the properties of an anionic membrane. They can generally be obtained by placing a cationic membrane and an anionic membrane side by side, exploiting for example, to this end, the technique described in International Patent Application WO 89/1059.

The electrodialysis cell used in the process according to the invention is divided into three compartments by a cationic membrane, an anionic membrane and a bipolar membrane. The bipolar membrane is inserted between the cationic membrane and the anionic membrane so that its anionic face is oriented towards the cationic membrane and its cationic face is oriented towards the anionic membrane. The cell is arranged between an anode and a cathode which are connected respectively to the positive terminal and to the negative terminal of a source of direct current. The arrangement of these two electrodes is such that the cationic membrane faces the anode and the anionic membrane faces the cathode. In practice, several (at least two) electrodialysis cells are combined in series between the anode and the cathode, so as to constitute and industrial electrodialyser.

In the following, the compartment delimited between the anionic membrane and the cationic membrane will be referred to as the saline compartment, the compartment delimited between the cationic membrane and the bipolar membrane will be referred to as the alkaline compartment and the compartment delimited between the anionic membrane and the bipolar membrane will be referred to as the acidic compartment.

In a manner known per se, an aqueous alkali metal halide solution is introduced into the saline compartment of the cell and an aqueous alkali metal hydroxide solution is collected from the alkaline compartment.

In accordance with the invention, an alkali metal halide is introduced into the acidic compartment and an aqueous hydrohalic acid and alkali metal halide solution is accordingly collected from this compartment.

By definition, a hydrohalic acid is an acid of general formula HX, in which X denotes a halogen, for example chlorine.

In the process according to the invention, the halide does not appear to be critical. The chloride is preferably selected.

The alkali metal halide of the solution which is introduced into the acidic compartment may be identical to or different from the alkali metal halide of the solution in the saline compartment. In practice, it is preferred to use the same alkali metal halide in both compartments.

The concentration of the aqueous alkali metal halide solution which is introduced into the saline compartment is not critical. However, it is preferred in practice to use a solution which is substantially saturated at the temperature and pressure prevailing in the electrodialysis cell.

The alkali metal halide may be introduced into the acidic compartment in any form which is compatible with the production of an aqueous solution in the said compartment, for example in the state of an anhydrous solid, in the state of an aqueous suspension or in the state of an aqueous solution. It is preferably used in the state of an aqueous solution. The latter may be a substantially saturated solution or a dilute solution. Seawater may be used.

Everything else remaining otherwise equal, it is observed that the introduction of alkali metal halide into the acidic compartment has the result of increasing the concentration of the alkali metal hydroxide solution collected from the alkaline compartment. Although not wishing to be bound by a theoretical explanation, the inventors think that the alkali metal halide introduced into the acidic compartment has the effect of reducing the osmotic diffusion of water across the bipolar membrane, from the acidic compartment to the alkaline compartment.

The amount of alkali metal halide which is introduced into the acidic compartment will consequently be imposed by the concentration desired for the aqueous alkali metal hydroxide solution collected from the alkaline compartment. It will moreover depend on the concentration of the aqueous alkali metal halide solution in the alkaline compartment, as well as on the membranes used. Consequently, it must be determined in each particular case. In practice, the introduction of the alkali metal halide into the acidic compartment is generally adjusted in order to obtain in the latter an aqueous hydrohalic acid solution containing more than 0.1 (preferably at least 0.5) mole of alkali metal halide per litre and less than 4 (preferably 3 at most) moles of alkali metal halide per litre. Concentrations of from 0.5 to 2 moles of alkali metal halide per litre of solution in the acidic compartment are especially recommended, particularly in order to produce, in the alkaline compartment, aqueous solutions substantially containing from 3 to 10 moles of alkali metal hydroxide per litre.

In the process according to the invention, a dilute aqueous alkali metal halide solution is collected from the saline compartment.

In an advantageous embodiment of the process according to the invention, the alkali metal halide is introduced into the acidic compartment in the state of a dilute aqueous solution which comprises at least a fraction of the dilute aqueous alkali metal halide solution withdrawn from the saline compartment. This embodiment of the process according to the invention allows water to be saved.

With the aim of adjusting the concentration of the alkali metal hydroxide solution collected from the alkaline compartment, or the productivity of the electrodialysis cell, it is possible, in accordance with a specific embodiment of the invention, to feed the alkaline compartment with water or a dilute aqueous alkali metal hydroxide solution.

The process according to the invention finds an advantageous application in the production of sodium hydroxide. In this application of the invention, the aqueous alkali metal halide solution which is introduced into the saline compartment is an aqueous sodium halide solution (preferably a sodium chloride solution). The alkali metal halide which is introduced into the acidic compartment is advantageously a sodium halide (preferably sodium chloride).

The process according to the invention has the appreciable advantage of enabling more concentrated alkali metal hydroxide solutions to be manufactured by electrodialysis, starting with alkali metal halide solutions. It has the additional advantage of enhancing the current efficiency of the anionic membrane, the current efficiency of the anionic membrane being, by definition, the mole fraction of the halide anion which actually crosses the membrane under the action of one faraday.

Characteristic features and details of the invention will emerge from the following description of the attached diagrams.

Figure 2:
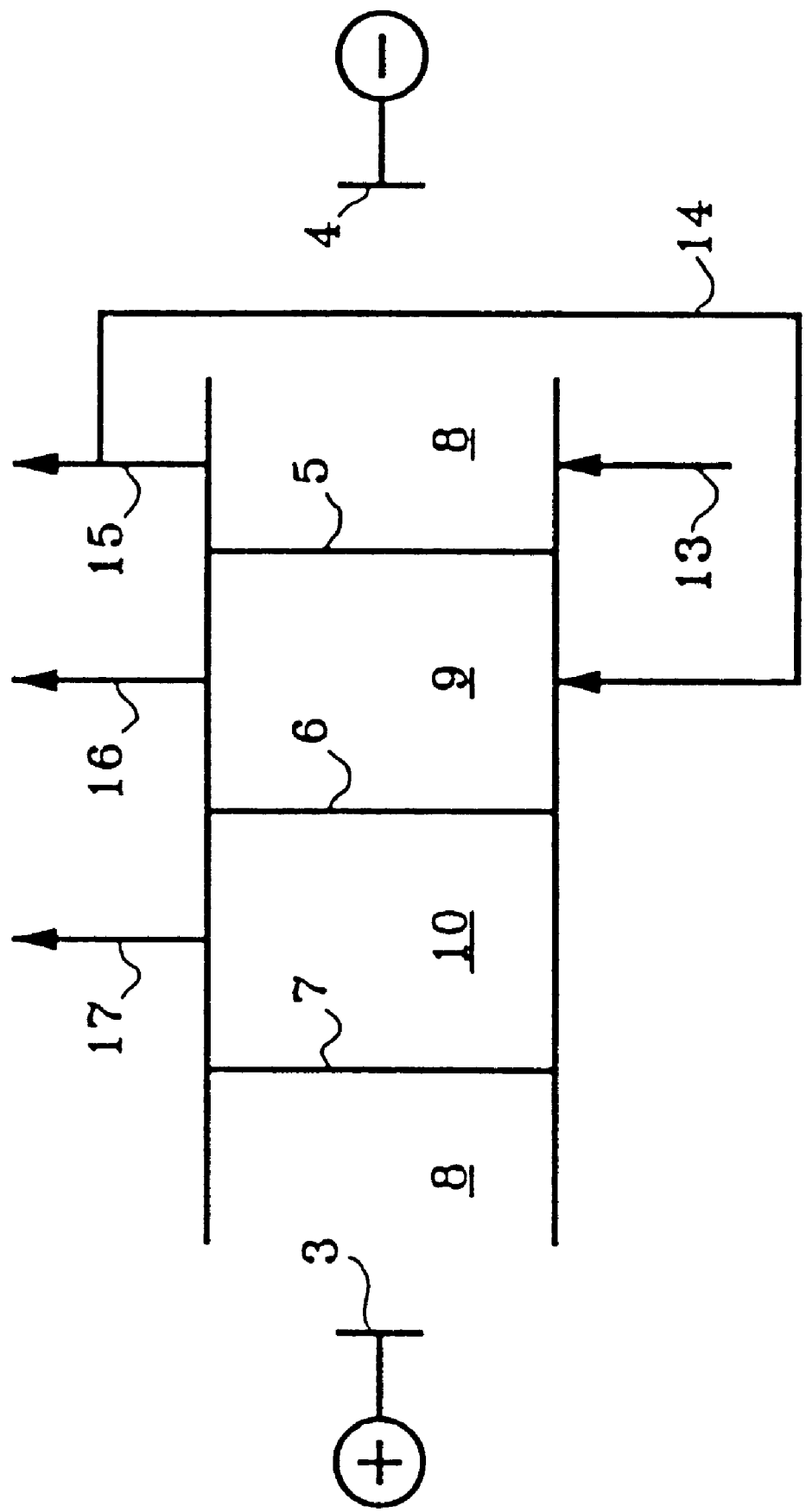
FIG. 2 is a schematic illustration of an embodiment of a process according to the invention, in which a fraction of the dilute aqueous sodium chloride solution 15, collected from the saline compartment 8, is withdrawn and introduced into the acidic compartment 9 in which it constitutes a dilute solution 14.

FIG. 1 is a schematic representation of an electrodialysis plant for the implementation of one specific embodiment of the process according to the invention;

FIG. 2 is a variant of the plant of FIG. 1.

In these figures, identical reference numbers denote the same components.

The plant represented in FIG. 1 comprises an electrodialyser consisting of several elemental electrodialysis cells 1, combined in series, in a chamber 2, between an anode 3 and a cathode 4 which are connected respectively to the positive terminal and to the negative terminal of a source of direct current. For simplicity, only one electrodialysis cell 1 is represented in the figure.

The electrodialysis cell 1 successively comprises, between the cathode 4 and the anode 3, an anionic membrane 5, a bipolar membrane 6 and a cationic membrane 7, respectively delimiting a saline compartment 8, an acidic compartment 9 and an alkaline compartment 10. The bipolar membrane has its anionic face 11 facing towards the anode 3 and its cationic face 12 facing towards the cathode 4.

During the running of the electrodialyser of FIG. 1, a substantially saturated aqueous sodium chloride solution 13 is introduced into the saline compartment 8 of the cell, a dilute aqueous sodium chloride solution 14 is introduced into the acidic compartment 9 and a dilute sodium chloride solution 15 is withdrawn from the saline compartment 8, an acidic aqueous sodium chloride solution 16 from the acidic compartment 9 and an aqueous sodium hydroxide solution 17 from the alkaline compartment 10 respectively. Under the effect of the electric field generated by the electrodes 3 and 4, there is dissociation of water at the bipolar membrane 6, giving rise to the formation of protons in the acidic compartments 9 and of hydroxyl cations in the alkaline compartment 10. Simultaneously, sodium cations migrate from the saline compartment 8 towards the alkaline compartment 10 and chloride anions migrate from the saline compartment 8 towards the acidic compartment 9. Moreover, water diffuses towards the alkaline compartment 10, on the one hand across the cationic membrane 7 with the sodium cations and, on the other hand by osmosis across the bipolar membrane 6. This results in dilution of the sodium hydroxide solution in the alkaline compartment 10. The purpose of the sodium chloride solution 14 is to reduce the water content in the sodium hydroxide solution 17, everything else remaining otherwise equal.

In one specific embodiment of the process according to the invention, represented schematically in FIG. 2, a fraction of the dilute aqueous sodium chloride solution 15 collected from the saline compartment 8 is withdrawn and is introduced into the acidic compartment 9, where it constitutes the abovementioned dilute solution 14.

The examples which follow serve to illustrate the invention.

In these examples, an electrodialysis cell of the type of that represented schematically in FIG. 1 has been used. The cell was fitted with a SELEMION® anionic membrane (ASAHI GLASS), a NAFION (900 series) cationic membrane and a bipolar membrane obtained by assembling a RAIPORE R-1030 anionic membrane (Pall Rai) and a RAIPORE R-4010 cationic membrane (Pall Rai).

The saline compartment was fed with a saturated aqueous sodium chloride solution and the electrodialysis was carried out at a current density of 1.5 kA/m$^2$ of bipolar membrane. The working temperature in the cell was maintained at about 50° C.

The concentration of the sodium hydroxide solution produced in the alkaline compartment and the current efficiency of the anionic membrane were measured.

EXAMPLE 1 (in accordance with the invention)

In this example, the acidic compartment was fed with an aqueous sodium chloride solution, so as to maintain in the acidic compartment a concentration substantially equal to 1.3 moles of NaCl per litre of solution.

After running for 35 days, the following results were recorded:

Concentration of the sodium hydroxide solution collected from the alkaline compartment: 250 g/kg.

Current efficiency of the anionic membrane: 86.4%.

EXAMPLE 2 (in accordance with the invention)

The test of Example 1 was repeated, except that a concentration substantially equal to 0.6 mole of NaCl per litre of solution was maintained in the acidic compartment.

After running for 28 days, the following results were recorded:

Concentration of the sodium hydroxide solution collected from the alkaline compartment: 220 g/kg.

Current efficiency of the anionic membrane: 86%.

EXAMPLE 3 (reference)

All the conditions of the test of Example 1 were repeated, the only exception being that the introduction of the sodium chloride solution into the acidic compartment of the electrodialysis cell was omitted.

After running for 35 days, the following results were recorded;

Concentration of the sodium hydroxide solution collected from the alkaline compartment: 190 g/kg.

Current efficiency of the anionic membrane: 85.0%.

A comparison of the results of Examples 1 and 2 (in accordance with the invention) with those of Example 3 (reference) shows the progress provided by the invention as regards the concentration of the aqueous sodium hydroxide solution produced and the current efficiency.

What is claimed is:

1. A process for concentrating an aqueous solution of an alkali metal hydroxide, in an electrodialysis cell containing three compartments, comprising:

circulating an aqueous alkali metal halide solution in a saline compartment of the cell, delimited between an anionic membrane and a cationic membrane, introducing an alkali metal halide into an acidic compartment of the cell, which is delimited between the anionic membrane and a cationic face of a bipolar membrane, and extracting a more concentrated aqueous alkali metal hydroxide solution from an alkaline compartment of the cell, delimited between the cationic membrane and an anionic face of the bipolar membrane, and extracting an aqueous solution of a hydrohalic acid and an alkali metal halide from said acidic compartment;

wherein said process further comprises
   adjusting the amount of the alkali metal halide which is introduced into the acidic compartment so that the aqueous solution extracted from the alkaline compartment substantially contains from 3 to 10 moles of alkali metal hydroxide per litre.

2. The process according to claim 1, wherein the aqueous alkali metal halide solution of the saline compartment is substantially saturated with alkali metal halide.

3. The process according to claim 1, comprising introducing the alkali metal halide into the acidic compartment in the state of an aqueous solution.

4. The process according to claim 3, wherein the aqueous alkali metal halide solution is introduced into the acidic compartment comprises at least a fraction of a dilute aqueous alkali metal halide solution which is withdrawn from the saline compartment.

5. The process according to claim 3, wherein the aqueous alkali metal halide solution which is introduced into the acidic compartment comprises seawater.

6. The process according to claim 1, comprising adjusting the introduction of the alkali metal halide into the acidic compartment in order to obtain in the latter an aqueous hydrohalic acid solution containing from 0.5 to 2 moles of alkali metal halide per litre.

7. The process according to claim 1, wherein the alkali metal halide which is introduced into the acidic compartment is the alkali metal halide of the solution introduced into the saline compartment.

8. The process according to claim 1, wherein the aqueous alkali metal halide solution is introduced into the saline compartment is an aqueous sodium chloride solution, and the alkali metal halide which is introduced into the acidic compartment comprises sodium chloride.

\* \* \* \* \*